United States Patent
Owada

(10) Patent No.: US 10,174,896 B2
(45) Date of Patent: Jan. 8, 2019

(54) LENS BODY AND LIGHTING TOOL FOR VEHICLE

(71) Applicant: Stanley Electric Co., Ltd., Tokyo (JP)

(72) Inventor: Ryotaro Owada, Kawasaki (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 12 days.

(21) Appl. No.: 15/377,127

(22) Filed: Dec. 13, 2016

(65) Prior Publication Data

US 2017/0167681 A1 Jun. 15, 2017

(30) Foreign Application Priority Data

Dec. 15, 2015 (JP) .................................. 2015-244046

(51) Int. Cl.
*F21V 1/00* (2006.01)
*F21S 41/14* (2018.01)
(Continued)

(52) U.S. Cl.
CPC ............... *F21S 41/14* (2018.01); *F21S 41/16* (2018.01); *F21S 41/17* (2018.01); *F21S 41/265* (2018.01);
(Continued)

(58) Field of Classification Search
CPC ............... G02B 6/0045; G02B 6/0058; G02B 19/0028; G02B 19/0047; F21S 48/1145;
(Continued)

(56) References Cited

U.S. PATENT DOCUMENTS 7,261,449 B2* 8/2007 Albou ................. B60Q 1/26
359/364
9,447,939 B2* 9/2016 Wintzer .............. F21S 48/1159
(Continued)

FOREIGN PATENT DOCUMENTS

DE 10 2013 013 995 A1 7/2014
EP 2 837 962 A1 2/2015
(Continued)

OTHER PUBLICATIONS

The extended European search report for the related European Patent Application No. 16203947.3 dated May 16, 2017.

*Primary Examiner* — Tsion Tumebo
(74) *Attorney, Agent, or Firm* — Kenealy Vaidya LLP

(57) ABSTRACT

A lens body configured to radiate light entering from a light source forward along a forward/rearward reference axis extending in a forward/rearward direction of a vehicle, the lens body including a first reflecting surface having an elliptic spherical shape, a second reflecting surface configured to internally reflect at least some of the light internally reflected by the first reflecting surface, and a light emitting surface, and the light emitting surface having a first leftward/rightward emission region configured to refract an entered light, which has passed through a first focal point, in a direction approaching a forward/rearward reference axis and a second leftward/rightward emission region configured to refract an entered light, which has passed through the first focal point, in a direction separating away from the forward/rearward reference axis at cross sections in a forward/rearward direction and a leftward/rightward direction.

11 Claims, 14 Drawing Sheets

(51) Int. Cl.
*G02B 19/00* (2006.01)
*F21S 41/17* (2018.01)
*F21S 41/20* (2018.01)
*F21S 41/265* (2018.01)
*F21S 41/27* (2018.01)
*F21S 41/32* (2018.01)
*F21S 41/36* (2018.01)
*F21S 41/43* (2018.01)
*F21S 41/16* (2018.01)
*F21Y 115/30* (2016.01)
*F21S 41/365* (2018.01)

(52) U.S. Cl.
CPC ............. *F21S 41/27* (2018.01); *F21S 41/285* (2018.01); *F21S 41/321* (2018.01); *F21S 41/322* (2018.01); *F21S 41/36* (2018.01); *F21S 41/43* (2018.01); *G02B 19/0028* (2013.01); *G02B 19/0047* (2013.01); *F21S 41/365* (2018.01); *F21Y 2115/30* (2016.08)

(58) Field of Classification Search
CPC ............. F21S 48/1186; F21S 48/1225; F21S 48/1275; F21S 48/1291; F21S 48/1323; F21S 48/1329; F21S 48/1388; F21S 48/145; F21Y 2115/30

USPC ........................................................ 362/509
See application file for complete search history.

(56) References Cited

U.S. PATENT DOCUMENTS

| | | | |
|---|---|---|---|
| 9,719,647 B2* | 8/2017 | Wintzer | G02B 19/0066 |
| 9,822,947 B2* | 11/2017 | Owada | F21V 7/0091 |
| 2004/0156209 A1* | 8/2004 | Ishida | F21S 48/1154 |
| | | | 362/516 |
| 2006/0083013 A1* | 4/2006 | Wanninger | G02B 6/0028 |
| | | | 362/509 |
| 2006/0087860 A1* | 4/2006 | Ishida | F21S 41/143 |
| | | | 362/517 |
| 2015/0043240 A1 | 2/2015 | Wiersdorff et al. | |
| 2015/0369436 A1 | 12/2015 | Wintzer et al. | |

FOREIGN PATENT DOCUMENTS

| | | |
|---|---|---|
| EP | 2 921 769 A1 | 9/2015 |
| GB | 2 436 691 A | 10/2007 |
| JP | 4047186 B2 | 2/2008 |
| JP | 2008-226542 A | 9/2008 |
| JP | 2010-108639 A | 5/2010 |
| JP | 2010-170836 A | 8/2010 |
| WO | 2013/068063 A1 | 5/2013 |

\* cited by examiner

LENS BODY AND LIGHTING TOOL FOR VEHICLE

CROSS-REFERENCE TO RELATED APPLICATION

Priority is claimed on Japanese Patent Application No. 2015-244046, filed Dec. 15, 2015, the contents of which are incorporated herein by reference.

BACKGROUND OF THE INVENTION

Field of the Invention

The present invention relates to a lens body and a lighting tool for a vehicle.

Description of Related Art

From the related art, a lighting tool for a vehicle in which a light source and a lens body are combined has been proposed (for example, Japanese Patent No. 4047186). In the lighting tool for a vehicle, light from the light source enters from an incidence part of the lens body into the lens body, some of the light is reflected by a reflecting surface of the lens body, and then, the light exits from a light emitting surface of the lens body to the outside of the lens body.

SUMMARY OF THE INVENTION

In the lighting tool for a vehicle of the related art, a metal reflection film (a reflecting surface) is formed on a surface of the lens body through metal deposition, and the light reflected by the metal reflection film is radiated forward. For this reason, loss of light may occur in the reflecting surface to cause a decrease in utilization efficiency of the light. In addition, in the above-mentioned lighting tool for a vehicle, since the light is concentrated and radiated to a central region, illuminance in a leftward/rightward direction is insufficient in comparison with a center.

The present invention is directed to provide a lighting tool for a vehicle and a lens body that are capable of effectively distributing light in a leftward/rightward direction while efficiently using light from a light source.

An aspect of the present invention is a lens body that is disposed in front of a light source and that includes a rear end portion and a front end portion, and that is configured to emit light from the light source, which has entered an inside of the lens body, forward from the front end portion along a forward/rearward reference axis extending in a forward/rearward direction of a vehicle, the lens body including: an incidence part configured to cause light having a predetermined angular range with respect to an optical axis of the light source, among the lights from the light source, to be refracted in a concentration direction and to be entered inside the lens body; a first reflecting surface configured to internally reflect the light from the light source which has entered from the incidence part; a second reflecting surface configured to internally reflect at least some of the light internally reflected by the first reflecting surface; and a light emitting surface disposed at the front end portion and configured to emit the light internally reflected by the first reflecting surface and the light internally reflected by the second reflecting surface forward, wherein an optical axis of the light source is inclined with respect to a vertical direction such that an incident angle of the light from the light source, which has entered from the incidence part, with respect to the first reflecting surface is a critical angle or more, the first reflecting surface includes an elliptic spherical shape rotatable symmetrical with respect to a major axis and has a first focal point and a second focal point serving as focal points of the elliptic spherical shape on the major axis, the second focal point is disposed at a vicinity of an imaginary light source position which is an intersection when it is assumed that refracted lights which are lights from the light source that have entered from the incidence part are extending in an opposite direction, the second reflecting surface is configured as a reflecting surface extending rearward from a vicinity of the first focal point, the light emitting surface has a convex shape at a cross section along a surface perpendicular to a leftward/rightward direction of the vehicle, the convex shape having an optical axis parallel to the forward/rearward reference axis and having a reference point formed at a point located at the vicinity of the first focal point, and the light emitting surface has a first leftward/rightward emission region and a second leftward/rightward emission region at a cross section along a surface perpendicular to an upward/downward direction of the vehicle, the first leftward/rightward emission region and the second leftward/rightward emission region being adjacent to each other in the leftward/rightward direction, the first leftward/rightward emission region refracts an entered light, which has passed through the first focal point, in a direction approaching the forward/rearward reference axis, the second leftward/rightward emission region refracts an entered light, which has passed through the first focal point, in a direction separating away from the forward/rearward reference axis, and among the lights internally reflected at the first reflecting surface, as the light which has reached the light emitting surface without being internally reflected at the second reflecting surface and the light which has reached the light emitting surface being internally reflected at the second reflecting surface are emitted from the light emitting surface to be radiated forward, a light distribution pattern including a cutoff line defined by a front edge of the second reflecting surface is formed at an upper edge the lens body.

In the above-mentioned configuration, among the light from the light source, the light having a predetermined angular range with respect to the optical axis of the light source (for example, light having high relative intensity within a range of ±60°) is refracted in a concentration direction to enter the lens body at the incidence part. Accordingly, an incident angle of the light having the predetermined angular range with respect to the first reflecting surface can have a critical angle or more. Further, in the above-mentioned configuration, as the optical axis of the light source is inclined with respect to the vertical axis, an incident angle of the light from the light source, which has entered the lens body, with respect to the first reflecting surface becomes a critical angle or more. That is, according to the above-mentioned configuration, since the light from the light source enters the first reflecting surface at the incident angle of the critical angle or more, reduction in cost can be achieved without necessity of metal deposition on the first reflecting surface, and reflection loss occurring in the vapor deposition surface can be suppressed to increase utilization efficiency of light.

In addition, in the above-mentioned configuration, the first leftward/rightward emission region and the second leftward/rightward emission region are formed at the cross sections of the light emitting surface which extends in the forward/rearward direction and the leftward/rightward direction. The light entering the light emitting surface passes through the vicinity of the first focal point because the light is reflected at the first reflecting surface having the elliptic spherical shape. The first leftward/rightward emission region refracts and emits the entered light which has passed through the first focal point in the direction approaching the forward/rearward reference axis that extends forward and rearward. Meanwhile, the second leftward/rightward emission region refracts and emits the entered light which has passed through the first focal point in a direction separating away from the forward/rearward reference axis that extends forward and rearward. That is, according to the above-mentioned configuration, since the regions in which the light is emitted in different left and right directions are formed at the light emitting surface, the light can be widely radiated in the leftward/rightward direction.

In addition, in the above-mentioned configuration, the lens body has a second reflecting surface extending rearward from the vicinity of the first focal point serving as one of focal points of the first reflecting surface. The second reflecting surface reflects the light which is going to pass below the first focal point upward, among the light internally reflected by the first reflecting surface. When the light which is going to pass below the first focal point enters the light emitting surface without being reflected by second reflecting surface, the light is emitted upward from the light emitting surface. Since the second reflecting surface is provided, the optical path of the light can be reversed in order to make the light enter above the light emitting surface and then the light can be emitted as the light directed downward from the light emitting surface. That is, according to the above-mentioned configuration, the light distribution pattern including the cutoff line can be formed at the upper edge. The above-mentioned light distribution pattern may be employed as, for example, a light distribution pattern for a low beam or a light distribution pattern for a fog lamp.

In addition, in the lens body, the light emitting surface may have a surface shape configured such that the light passing through the vicinity of the first focal point is emitted in a direction substantially parallel to the forward/rearward reference axis when viewed from the side in a horizontal direction.

In the above-mentioned configuration, a surface shape of the light emitting surface is configured to emit the light passing the reference point in a direction substantially parallel to the forward/rearward reference axis. The light distribution pattern that is formed by the lens body has a cutoff line extending in front of the forward/rearward reference axis. According to the above-mentioned configuration, the vicinity of the cutoff line is relatively brightened to form a region having highest illuminance.

In addition, in the lens body, the light emitting surface may have a first upward/downward emission region and a second upward/downward emission region at a cross section along a surface perpendicular to the leftward/rightward direction, the first upward/downward emission region may have a convex shape having the reference point as a reference, and the second upward/downward emission region may be adjacent to the first upward/downward emission region in the light emitting surface in the upward/downward direction, and may emit the entered light, which has passed through a vicinity of the reference point, in a direction inclined upward with respect to the forward/rearward reference axis.

According to the above-mentioned configuration, the first upward/downward emission region and the second upward/downward emission region are formed at the cross sections of the light emitting surface which extends along the forward/rearward direction and the upward/downward direction. Since the second upward/downward emission region emits the entered light which has passed through the vicinity of the reference point in a direction inclined upward with respect to the forward/rearward reference axis, the emitted light can be used as the light for radiating a traffic sign or the like (hereinafter, referred to as overhead light).

In addition, in the lens body, the second leftward/rightward emission region may have a concave shape recessed at a central portion of the second leftward/rightward emission region when seen in the upward/downward direction, and the first leftward/rightward emission region may have convex shapes arranged at both sides in the leftward/rightward direction of the second leftward/rightward emission region.

According to the above-mentioned configuration, the second leftward/rightward emission region that forms a concave shape at a central side overlapping the forward/rearward reference axis when seen in the upward/downward direction is disposed at the light emitting surface, and the first leftward/rightward emission regions that form a convex shape are disposed at both of left and right sides of the second leftward/rightward emission region. Accordingly, the light can be widely radiated toward both of the left and right sides with respect to the forward/rearward reference axis.

In addition, in the lens body, a distance and eccentricity between the first focal point and the second focal point of the first reflecting surface may be set such that the light from the light source internally reflected by the first reflecting surface and concentrated to the vicinity of the focal point of the light emitting surface is captured by the light emitting surface.

According to the above-mentioned configuration, since a larger amount of light can be captured by the light emitting surface, light utilization efficiency is improved.

In addition, in the lens body, the major axis may be inclined with respect to the forward/rearward reference axis and the second focal point may be disposed below the first focal point.

According to the above-mentioned configuration, as the major axis is inclined while the second focal point side is directed downward, the light obtained by internally reflecting the light from the light source at the first reflecting surface and the second reflecting surface is easily captured by the light emitting surface. In addition, according to the above-mentioned configuration, the incident angle of the light entering the first reflecting surface from the light source is likely to be a critical angle or more, and total inflection by the first reflecting surface can be easily realized. According to the above-mentioned configuration, utilization efficiency of light can be increased by these actions.

In the lens body according to another aspect of the present invention, the second reflecting surface may be set to an angle with respect to the forward/rearward reference axis such that the light internally reflected by the second reflecting surface, among the light internally reflected by the first reflecting surface, is captured by the light emitting surface.

According to the above-mentioned configuration, since a larger amount of light can be captured by the light emitting surface, light utilization efficiency is improved.

In the lens body, the second reflecting surface may be set to an angle with respect to the forward/rearward reference axis such that the light reaching the light emitting surface being internally reflected by the first reflecting surface and not being internally reflected by the second reflecting surface is not shielded.

According to the above-mentioned configuration, since a larger amount of light can be captured by the light emitting surface, light utilization efficiency is improved.

In the lens body, the front edge of the second reflecting surface may be formed so as to extend more forward as separated from a center part thereof in the leftward/rightward direction.

According to the above-mentioned configuration, a clear cutoff line can be formed at the light distribution pattern.

In the lens body, the second reflecting surface may include a main surface section and a sub-surface section deviated with respect to the main surface in the vertical direction, at least a part of the boundary of the main surface section and the sub-surface section may be extended backward from the front edge.

According to the above-mentioned configuration, a vertical step can be formed at the cutoff line of the light distribution pattern. Accordingly, asymmetric light distribution pattern can be realized such as radiating far distance in the traveling lane in front of the vehicle and radiating only the vicinities in the opposite lane of the approaching vehicle.

A lighting tool for a vehicle of the present invention includes the lens body and the light source.

According to the above-mentioned configuration, the lighting tool for a vehicle capable of exhibiting the above-mentioned effects can be provided.

According to the aspect of the present invention, a lens body that can be employed for a lighting tool for a vehicle capable of effectively distributing light in a leftward/rightward direction while using light from a light source with high efficiency and a lighting tool for a vehicle including the same can be provided.

DETAILED DESCRIPTION OF THE INVENTION

First Embodiment

Figure 1:
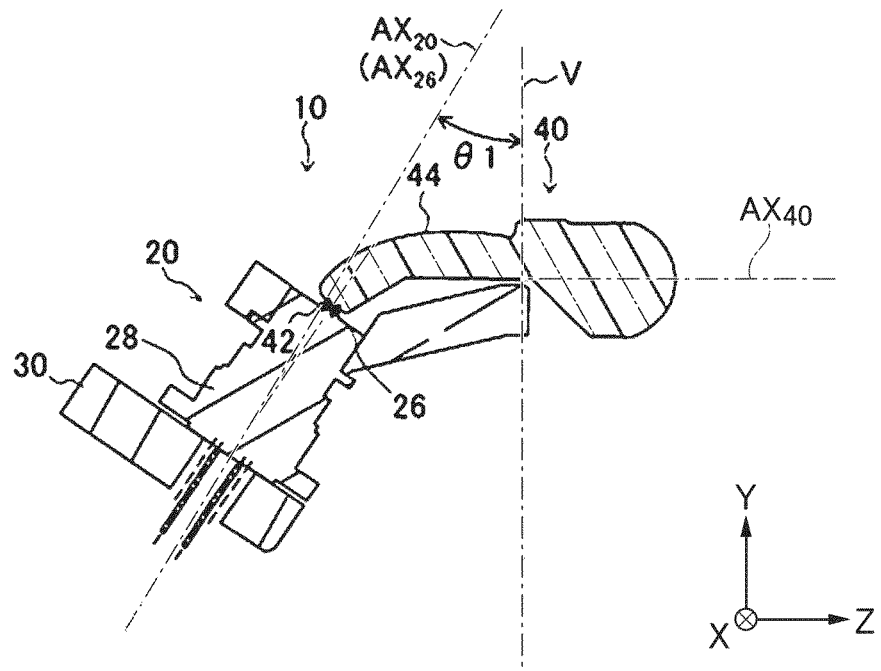
FIG. 1 is a cross-sectional view of a lighting tool for a vehicle of a first embodiment.

Hereinafter, a lens body 40 and a lighting tool 10 for a vehicle including the lens body 40 serving as a first embodiment of the present invention will be described with reference to the accompanying drawings.

In the following description, a forward/rearward direction is referred to as a forward/rearward direction of a vehicle on which the lens body 40 or the lighting tool 10 for a vehicle is mounted, and the lighting tool 10 for a vehicle is a member configured to radiate light forward. Further, the forward/rearward direction is one direction in a horizontal surface unless the context indicates otherwise. Further, a leftward/rightward direction is one direction in the horizontal surface and a direction perpendicular to the forward/rearward direction unless the context indicates otherwise.

In the specification, extending in the forward/rearward direction (or extending forward/rearward) also includes extending in a direction inclined within a range of less than 45° with respect to the forward/rearward direction, in addition to extending strictly in the forward/rearward direction. Similarly, in the specification, extending in the leftward/rightward direction (or extending leftward/rightward) also includes extending in a direction inclined within a range of less than 45° with respect to the leftward/rightward direction, in addition to extending strictly in the leftward/rightward direction.

In addition, in the drawings, an XYZ coordinate system serving as an appropriate three-dimensional orthogonal coordinate system is shown. In the XYZ coordinate system, a Z-axis direction is an upward/downward direction (a vertical direction), and a +Z direction is an upward direction. In addition, an X-axis direction is a forward/rearward direction, and a +X direction is a forward direction (a front side). Further, a Y-axis direction is a leftward/rightward direction.

Further, the drawings used in the following description may show enlarged characterized parts for convenience in order to allow easy understanding of the characterized parts, and dimensional ratios or the like of the components may not be equal to that in actuality.

In addition, in the following description, the case in which two points are "disposed adjacent to each other" includes the case in which two points coincide with each other as well as the case in which two points are simply disposed close to each other.

FIG. 1 is a cross-sectional view of the lighting tool 10 for a vehicle. In addition, FIG. 2 is a partial cross-sectional view of the lighting tool 10 for a vehicle.

As shown in FIG. 1, the lighting tool 10 for a vehicle includes the lens body 40, a light emitting device 20, and a heat sink 30 configured to cool the light emitting device 20. The lighting tool 10 for a vehicle emits the light radiated from the light emitting device 20 toward a forward side via the lens body 40.

Figure 2:
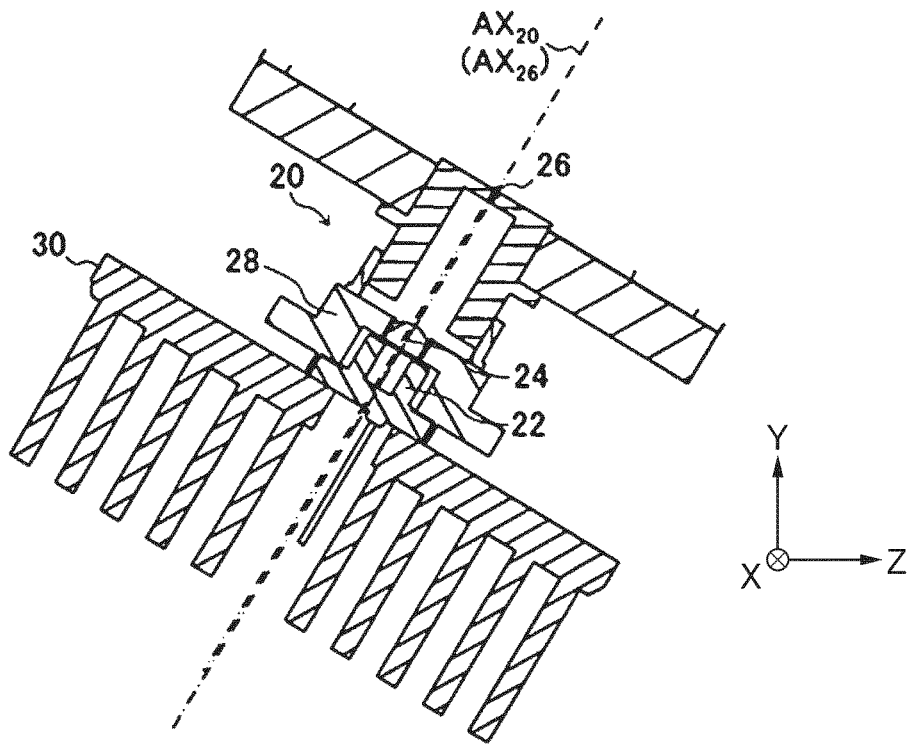
FIG. 2 is a partial cross-sectional view of the lighting tool for a vehicle of the first embodiment.

As shown in FIG. 2, the light emitting device 20 radiates light along an optical axis $AX_{20}$. The light emitting device 20 has a semiconductor laser element 22, a condensing lens 24, a wavelength conversion member (a light source) 26, and a holding member 28 configured to hold these. The semiconductor laser element 22, the condensing lens 24 and the wavelength conversion member 26 are sequentially disposed along the optical axis $AX_{20}$.

The semiconductor laser element 22 is a semiconductor laser light source such as a laser diode or the like configured to discharge laser beams of a blue area (for example, an emission wavelength is 450 nm). The semiconductor laser element 22 is mounted on, for example, a CAN type package and sealed therein. The semiconductor laser element 22 is held at the holding member 28 such as a holder or the like. Further, as another embodiment, a semiconductor emitting device such as an LED device or the like may be used instead of the semiconductor laser element 22.

The condensing lens 24 concentrates laser beams from the semiconductor laser element 22. The condensing lens 24 is disposed between the semiconductor laser element 22 and the wavelength conversion member 26.

The wavelength conversion member 26 is constituted by, for example, a fluorescent body of a rectangular plate shape having a light emitting size of 0.4×0.8 mm. The wavelength conversion member 26 is disposed at a position spaced, for example, about 5 to 10 mm from the semiconductor laser element 22. The wavelength conversion member 26 receives the laser beams concentrated by the condensing lens 24 and converts at least some of the laser beams into light having a different wavelength. More specifically, the wavelength conversion member 26 converts laser beams of a blue area into yellow light. The yellow light converted by the wavelength conversion member 26 is mixed with the laser beams of the blue area passing through the wavelength conversion member 26 and discharged as white light (quasi white light). Accordingly, the wavelength conversion member 26 functions as a light source configured to discharge white light. Hereinafter, the wavelength conversion member 26 is also referred to as the light source 26.

The light radiated from the light source 26 enters an incident surface 42, which will be described below, to advance inside of the lens body 40, and is internally reflected by a first reflecting surface 44 (see FIG. 1) described below.

The optical axis $AX_{26}$ of the light source 26 coincides with the optical axis $AX_{20}$ of the light emitting device 20. As shown in FIG. 1, the optical axis $AX_{26}$ is inclined at an angle θ1 with respect to a vertical axis V extending in a vertical direction (a Z-axis direction). The angle θ1 of the optical axis $AX_{26}$ with respect to the vertical axis V is set such that an incident angle of the light, which is emitted from the light source and which enters from the incident surface 42 into the lens body 40, with respect to the first reflecting surface 44 is a critical angle or more.

Figure 3A:
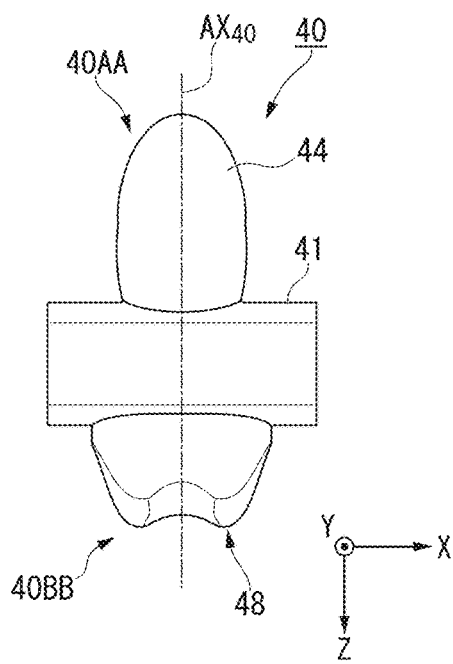
FIG. 3A is a plan view of a lens body of the first embodiment.
Figure 3C:
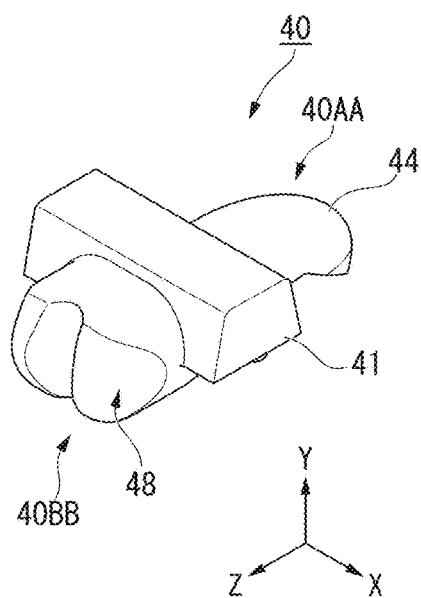
FIG. 3C is a perspective view of the lens body of the first embodiment.
Figure 3B:
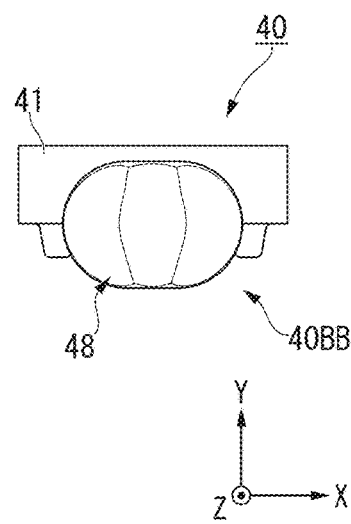
FIG. 3B is a front view of the lens body of the first embodiment.
Figure 3D:
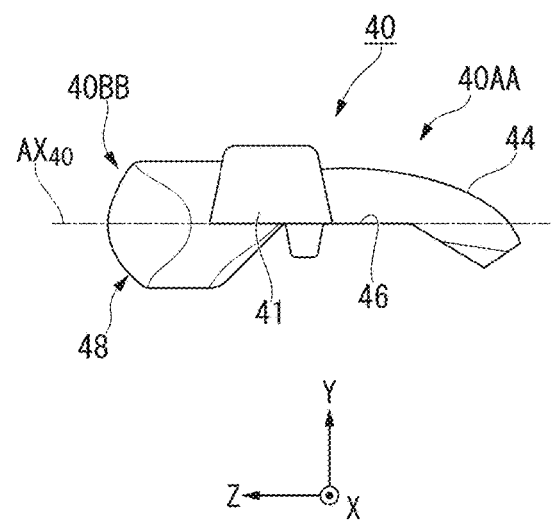
FIG. 3D is a side view of the lens body of the first embodiment.
Figure 4:
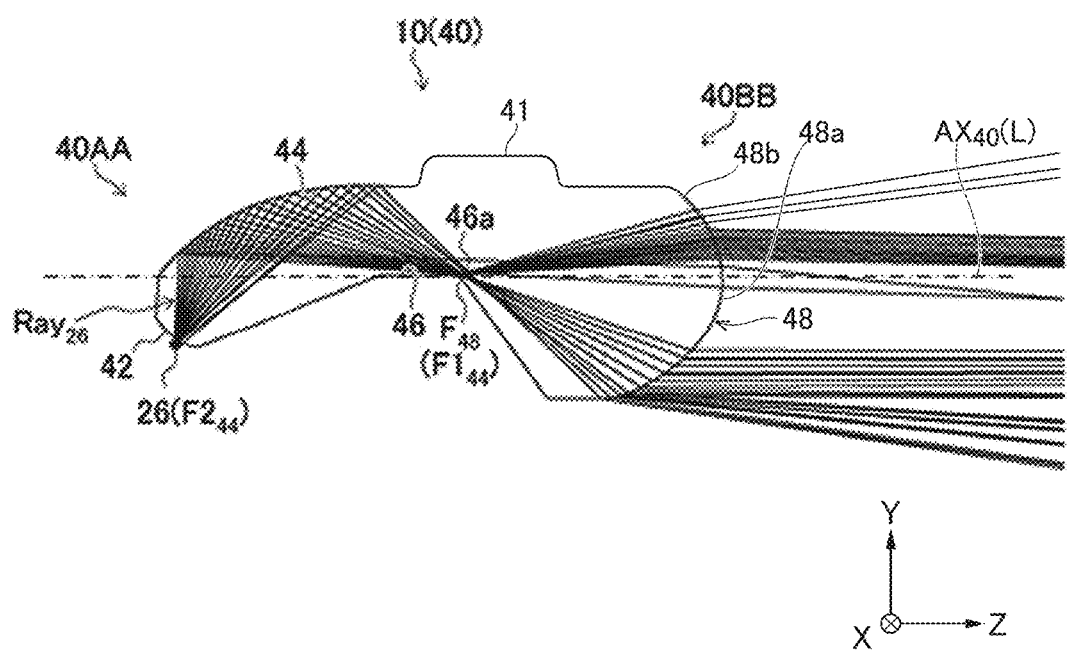
FIG. 4 is a cross-sectional view of the lens body of the first embodiment along an YZ plane.

FIG. 3A is a plan view of the lens body 40, FIG. 3B is a front view of the lens body 40, FIG. 3C is a perspective view of the lens body 40 and FIG. 3D is a side view of the lens body 40. FIG. 4 is a cross-sectional view of the lens body 40 along an YZ plane, schematically showing an optical path through which light from the light source 26 enters the lens body 40.

The lens body 40 is a solid multi-face lens body having a shape extending along a forward/rearward reference axis $AX_{40}$. Further, in the embodiment, the forward/rearward reference axis $AX_{40}$ is an axis extending in a forward/rearward direction (an Z-axis direction) of a vehicle and serving as a reference line passing through a center of a light emitting surface 48 of the lens body 40, which will be described below. The lens body 40 is disposed in front of the light source 26. The lens body 40 includes a rear end portion 40AA directed rearward, and a front end portion 40BB directed forward. In addition, as shown in FIGS. 3A to 3D, the lens body 40 has a fixing section 41 extending in a leftward/rightward direction between the front end portion 40BB and the rear end portion 40AA. The lens body 40 is fixed to the vehicle at the fixing section 41.

The lens body 40 can be formed of a material having a higher refractive index than that of air, for example, a transparent resin such as polycarbonate, acryl, or the like, glass, or the like. In addition, when a transparent resin is used for the lens body 40, the lens body 40 can be formed through injecting molding using a mold.

The lens body 40 has the incident surface (an incidence part) 42, the first reflecting surface 44, a second reflecting surface 46 and the light emitting surface 48. The incident surface 42 and the first reflecting surface 44 are disposed at the rear end portion 40AA of the lens body 40. In addition, the light emitting surface 48 is disposed at the front end portion 40BB of the lens body 40. The second reflecting surface 46 is disposed between the rear end portion 40AA and the front end portion 40BB.

The lens body 40 emits light $Ray_{26}$, which is emitted from the light source 26 and which enters the lens body 40 from the incident surface 42 disposed at the rear end portion 40AA, forward from the light emitting surface 48 disposed at the front end portion 40BB along the forward/rearward reference axis $AX_{40}$. Accordingly, the lens body 40 forms a low beam light distribution pattern P (see FIG. 11) including a cutoff line CL at an upper edge, which will be described below.

Figure 5A:
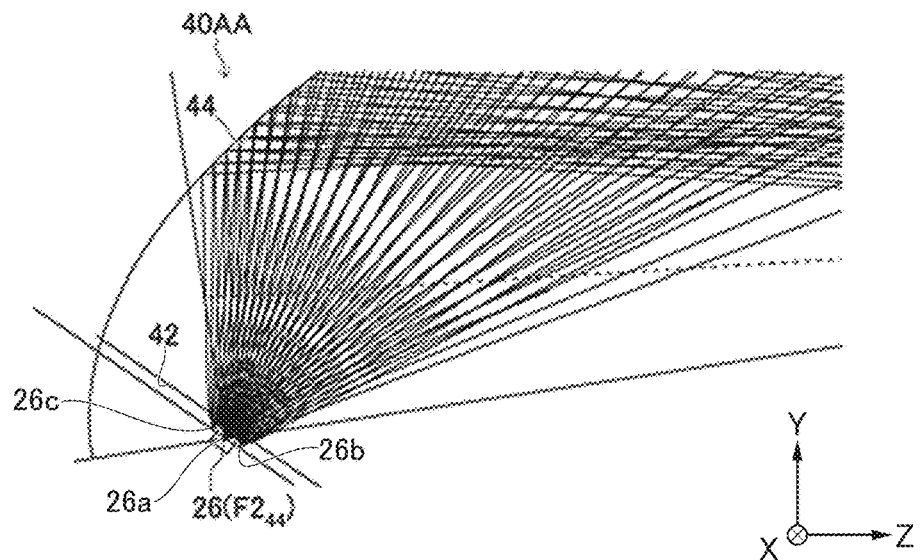
FIG. 5A is a partially enlarged view of a light source and the vicinity of an incident surface of the lens body of the first embodiment.

FIG. 5A is a partially enlarged view of the vicinity of the light source 26 and the incident surface 42 of the lens body 40.

The light source 26 has a light emitting surface with a predetermined area. For this reason, the light radiated from the light source 26 is radially spread from points in the light emitting surface. The light passing through the lens body 40 follows optical paths different according to light emitted from the points in the light emitting surface. In the specification, description will be performed in consideration of the optical path of light radiated from a light source central point 26a serving as a center of the light emitting surface (i.e., a center of the light source 26), a light source front end point 26b serving as an end point of a forward side, and a light source rear end point 26c serving as an end point of a rearward side.

Figure 5B:
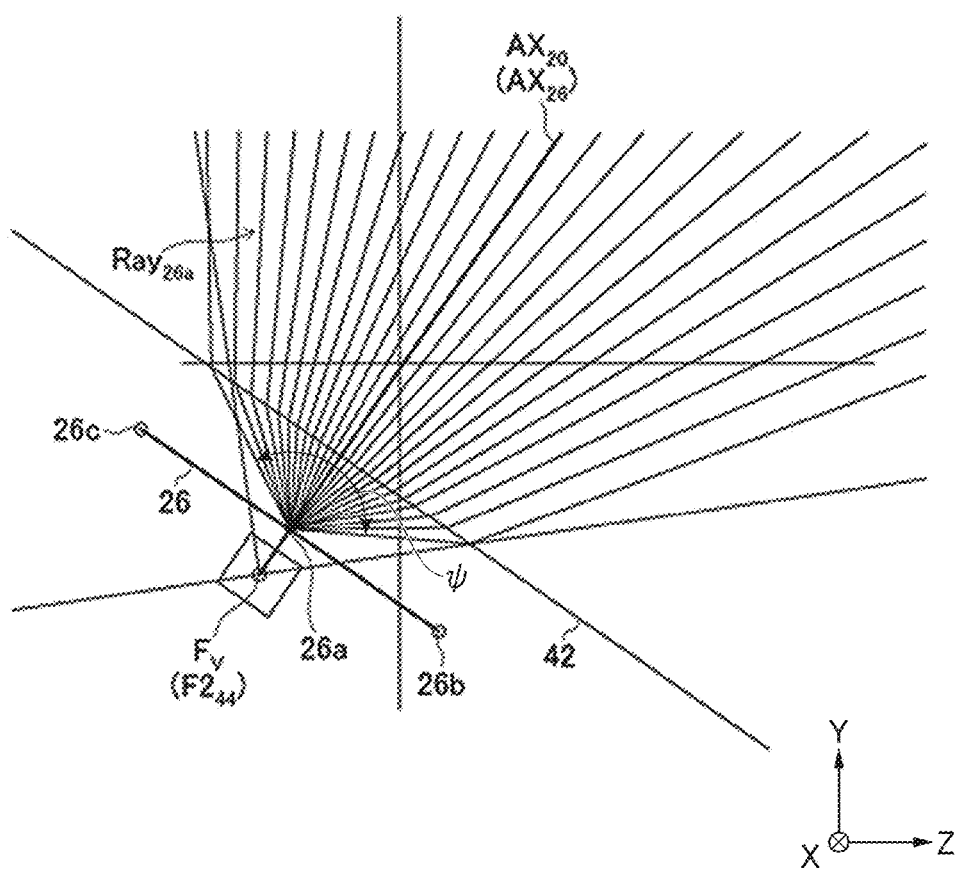
FIG. 5B is an enlarged view of a portion of FIG. 5A.

FIG. 5B is a view showing a route of the light emitted from the light source central point 26a, which is an enlarged view of a portion of FIG. 5A. In the specification, an intersection when the light refracted from the light source central point 26a at the incident surface 42 and entering the lens body 40 is extended in opposite directions is set as an imaginary light source position $F_V$. The imaginary light source position $F_V$ is a position of the light source, provided that the light source is integrally disposed inside the lens body 40. Further, in the embodiment, since the incident surface 42 is a plane but not a lens surface, the light entering the lens body 40 does not cross each other at one point even when the light extends in opposite directions. More specifically, the light crosses at a rearward side on the optical axis L as it goes away from an optical axis L. For this reason, the intersection at which the optical path closest to the optical axis L crosses is the imaginary light source position $F_{V}$.

As shown in FIG. 5B, the incident surface 42 is a surface at which light in a predetermined angular range Ψ among light $Ray_{26a}$ from the light source 26 is refracted in a concentrating direction to enter the lens body 40. Here, the light of the predetermined angular range Ψ is light having high relative intensity within a range of, for example, ±60° with respect to the optical axis $AX_{26}$ of the light source 26 from the light radiated from the light source 26. In the embodiment, the incident surface 42 is configured as a surface with a plane shape (or a curved surface shape) parallel with respect to the light emitting surface of the light source 26 (in FIG. 5B, see a straight line that connects the light source front end point 26b and the light source rear end point 26c). Further, a configuration of the incident surface 42 is not limited to the configuration of the embodiment. For example, the incident surface 42 may have a linear shaped cross-sectional shape in a vertical surfaces (and a plane parallel thereto) including the forward/rearward reference axis $AX_{40}$, and a cross-sectional shape in a plane perpendicular to the forward/rearward reference axis $AX_{40}$, which is an arc-shaped surface concave toward the light source 26. However, the incident surface may have other shaped surfaces. The cross-sectional shape in the plane perpendicular to the forward/rearward reference axis $AX_{40}$ is a shape obtained in consideration of a distribution in the leftward/rightward direction of the low beam light distribution pattern P.

Figure 6:
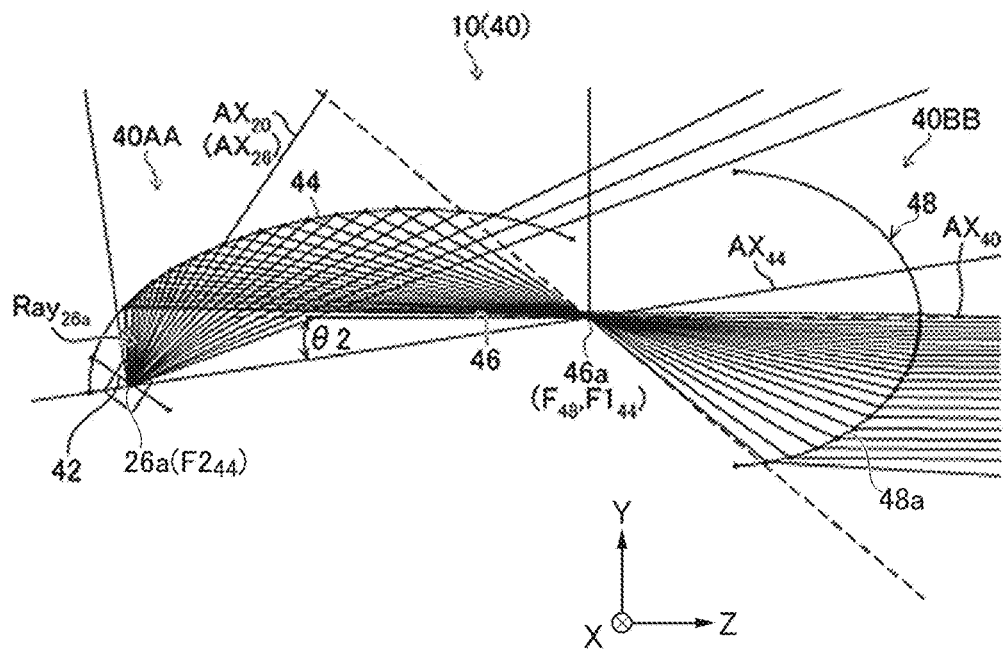
FIG. 6 is a cross-sectional schematic view of the lens body of the first embodiment, showing an optical path of light radiated from a central point of the light source.
Figure 7:
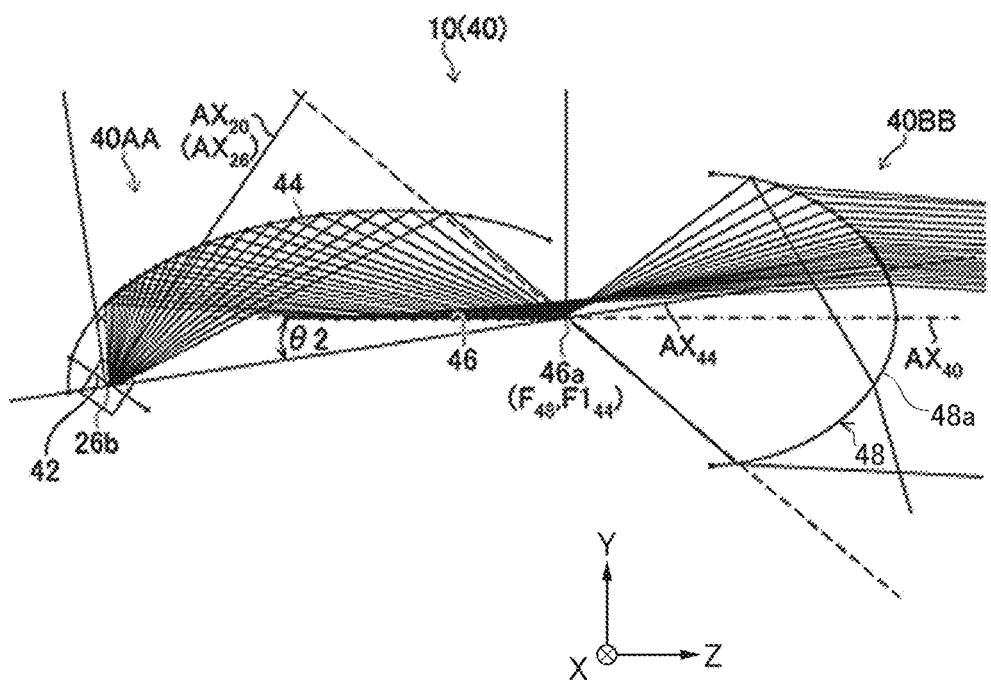
FIG. 7 is a cross-sectional schematic view of the lens body of the first embodiment, showing an optical path of light radiated from a front end point of the light source.
Figure 8:
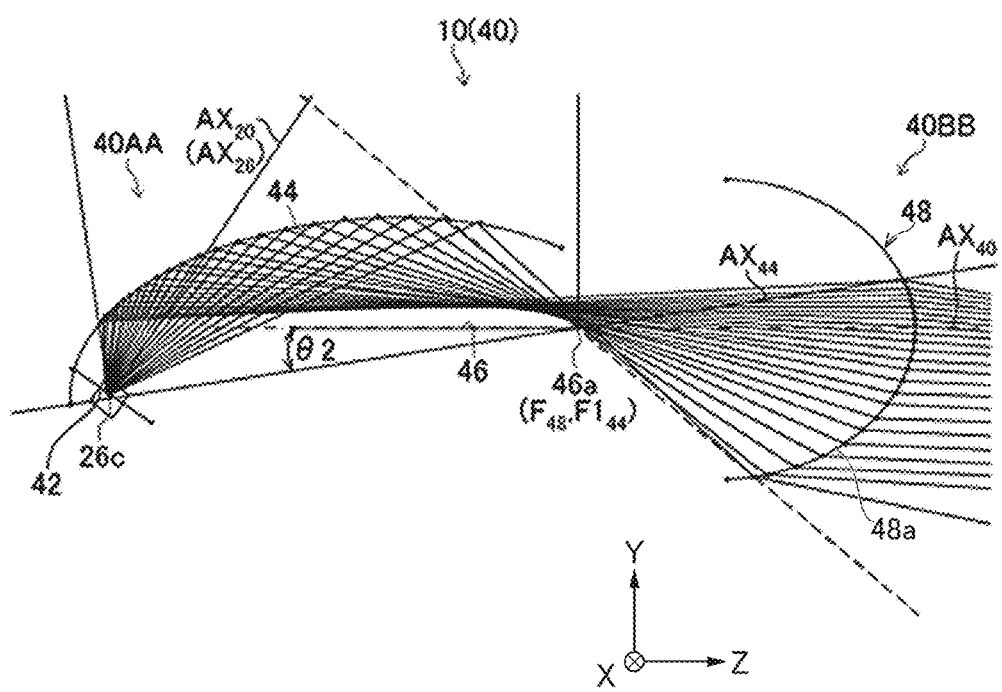
FIG. 8 is a cross-sectional schematic view of the lens body of the first embodiment, showing an optical path of light radiated from a rear end point of the light source.

FIGS. 6 to 8 are cross-sectional schematic views of the lens body 40, FIG. 6 shows an optical path of light radiated from the light source central point 26a, FIG. 7 shows an optical path of light radiated from the light source front end point 26b, and FIG. 8 shows an optical path of light radiated from the light source rear end point 26c. Further, FIGS. 6 to 8 are schematic views of configurations of the lens body 40 but do not show cross-sectional shapes in actuality. In particular, in the light emitting surface 48, a second upward/downward emission region 48b, which will be described below, is omitted, and only a first upward/downward emission region 48a is shown.

As shown in FIG. 6, the light radiated from the light source central point 26a is internally reflected by the first reflecting surface 44 to be concentrated to a first focal point $F1_{44}$, and then, directed forward from the first upward/downward emission region 48a of the light emitting surface 48 to be emitted to be parallel to the forward/rearward reference axis $AX_{40}$.

As shown in FIG. 7, the light radiated from the light source front end point 26b is internally reflected by the first reflecting surface 44 to be directed downward farther than the first focal point $F1_{44}$. Further, after the light is internally reflected upward by the second reflecting surface 46, the light is emitted forward and downward from the first upward/downward emission region 48a of the light emitting surface 48.

As shown in FIG. 8, the light radiated from the light source rear end point 26c is internally reflected by the first reflecting surface 44 to pass therethrough upward farther than the first focal point $F1_{44}$, and emitted forward and downward from the first upward/downward emission region 48a of the light emitting surface 48.

Hereinafter, components of the lens body 40 will be described based on FIGS. 6 to 8.

<First Reflecting Surface>

The first reflecting surface 44 is a surface configured to internally reflect (totally reflect) the light from the light source 26 entering the lens body 40 from the incident surface 42. The first reflecting surface 44 includes an elliptic spherical shape that is rotationally symmetrical with respect to a major axis $AX_{44}$. The first reflecting surface 44 has the first focal point $F1_{44}$ and a second focal point $F2_{44}$, which serve as focal points of the elliptic spherical shape, on the major axis $AX_{44}$.

The second focal point $F2_{44}$ is disposed in the vicinity of the imaginary light source position $F_{V}$. The light radiated from one of the first focal point $F1_{44}$ and the second focal point $F2_{44}$ is concentrated to the other side due to properties of an ellipse. Accordingly, as shown in FIG. 6, the light radiated from the light source central point 26a progresses through the lens body 40 via the incident surface 42 to be concentrated to the first focal point $F1_{44}$. Further, the first focal point $F1_{44}$ is disposed in the vicinity of a light emitting surface focal point (reference point) $F_{48}$ of the light emitting surface 48, which will be described below. That is, the first reflecting surface 44 has a surface shape configured such that the internally reflected light from the light source central point 26a is concentrated to the vicinity of the light emitting surface focal point $F_{48}$ of the light emitting surface 48.

A distance and eccentricity between the first focal point $F1_{44}$ and the second focal point $F2_{44}$ of the first reflecting surface 44 are determined such that the light from the light source 26 concentrated to the vicinity of the light emitting surface focal point $F_{41}$ of the light emitting surface 48 internally reflected by the first reflecting surface 44 is captured by the light emitting surface 48. Accordingly, since a larger amount of light can be captured by the light emitting surface 48, light utilization efficiency is improved.

The major axis $AX_{44}$ is inclined at an angle θ2 with respect to the forward/rearward reference axis $AX_{40}$. The major axis $AX_{44}$ is inclined upward as it goes forward such that the second focal point F24 is disposed below the first focal point $F1_{4}$. As the major axis $AX_{44}$ is inclined while the second focal point $F2_{44}$ side is directed downward, an angle of the light internally reflected by the second reflecting surface 46 with respect to the forward/rearward reference axis $AX_{40}$ is shallow. Accordingly, the light radiated from the light source front end point 26b and internally reflected by the first reflecting surface 44 and the second reflecting surface 46 can be easily captured by the light emitting surface 48. Accordingly, in comparison with the case in which the major axis $AX_{44}$ is not inclined with respect to the forward/rearward reference axis $AX_{40}$ (i.e., when the angle θ2=0°), a size of the light emitting surface 48 can be reduced and a larger amount of light can be captured by the light emitting surface 48. In addition, as the major axis $AX_{44}$ is inclined while the second focal point $F2_{44}$ side is directed downward, an incident angle of light entering the first reflecting surface 44 from the light source 26 is likely to be increased to a critical angle or more. Accordingly, the light emitted from the light source 26 is likely to be totally reflected by the first reflecting surface 44, and utilization efficiency of light can be increased.

<Second Reflecting Surface>

The second reflecting surface 46 is a surface configured to internally reflect (totally reflect) at least some of the light from the light source 26 internally reflected by the first reflecting surface 44. The second reflecting surface 46 is configured as a reflecting surface extending rearward form the vicinity of the first focal point $F1_{44}$. That is, the first focal point $F1_{44}$ is substantially disposed in an extension surface of the second reflecting surface 46. In the embodiment, the second reflecting surface 46 has a planar shape extending in parallel to the forward/rearward reference axis $AX_{40}$.

The second reflecting surface 46 reflects light, among the light internally reflected by the first reflecting surface 44, passing below the first focal point $F1_{44}$ to the upward direction. When the light passing below the first focal point $F1_{44}$ enters the light emitting surface 48 without being reflected by the second reflecting surface 46, the light is emitted upward from the light emitting surface 48. As the second reflecting surface 46 is formed, the optical path of the light can be reversed and the light can enter above the light emitting surface 48 to be emitted downward. That is, since the second reflecting surface 46 is formed, the lens body 40 can reverse the optical path of the light, which is directing upward from the light emitting surface 48, and can form a light distribution pattern including the cutoff line CL at an upper edge of the lens body 40. A front edge 46a of the second reflecting surface 46 includes an edge shape configured to shield some of the light from the light source 26 internally reflected by the first reflecting surface 44 to form the cutoff line CL of the low beam light distribution pattern P. The front edge 46a of the second reflecting surface 46 is disposed in the vicinity of the first focal point $F1_{44}$.

The second reflecting surface 46 may be parallel to or inclined with respect to the forward/rearward reference axis $AX_{40}$. Here, an angle of the second reflecting surface 46 with respect to the forward/rearward reference axis $AX_{40}$ will be described as an angle θ3 (not shown). Further, in the embodiment, the angle θ3=0°.

The angle θ3 of the second reflecting surface 46 with respect to the forward/rearward reference axis $AX_{40}$ may be determined such that the light entering the second reflecting surface 46, among the light from the light source 26 internally reflected by the first reflecting surface 44, is internally reflected by the second reflecting surface 46, and the reflected light is efficiently incorporated into the light emitting surface 48. Accordingly, since a larger amount of light can be captured by the light emitting surface 48, light utilization efficiency is improved. That is, the angle θ3 of the second reflecting surface 46 with respect to the forward/rearward reference axis $AX_{40}$ may be set such that the light internally reflected by the second reflecting surface 46 has an angle to be sufficiently captured by the light emitting surface 48.

In addition, the angle θ3 of the second reflecting surface 46 with respect to the forward/rearward reference axis $AX_{40}$ may be set to have an angle such that the light reaching the light emitting surface 48 while internally reflected by the first reflecting surface 44 but not internally reflected by the second reflecting surface 46 is not shielded.

In the embodiment, the angle θ3=0° is employed in consideration of the above-mentioned description.

<Light Emitting Surface>

The light emitting surface 48 is a lens surface protruding forward. The light emitting surface 48 emits the light internally reflected by the first reflecting surface 44 and the light internally reflected by the first reflecting surface 44 and the second reflecting surface 46 forward. The light emitting surface 48 has a convex shape at a cross section along a surface perpendicular to a leftward/rightward direction of the vehicle, the convex shape having an optical axis parallel to the forward/rearward reference axis $AX_{40}$ and having a reference point $F_{48}$ formed at a point located at the vicinity of the first focal point $F1_{44}$. The reference point $F_{48}$ means a point located at the center of a region where the light concentrates at front of the light emitting surface 48 when the light emitted from the light emitting surface 48 forms a desired light distribution pattern. In the embodiment, the light emitting surface 48 does not have a cross section having a strictly uniform curvature radius in the vertical direction. Therefore, the light emitting surface 48 does not have a focal point in the strict sense, however, the reference point $F_{48}$ where the light concentrate can be treated as a focal point. In the embodiment, the reference point of the light emitting surface 48 is called as a light emitting surface focal point $F_{48}$.

As shown in FIG. 4, the light emitting surface 48 has the first upward/downward emission region 48a and the second upward/downward emission region 48b in a cross section along a surface (an XZ plane) perpendicular to the leftward/rightward direction of the vehicle. The first upward/downward emission region 48a has a convex shape (a convex lens shape) that constitutes the majority of the light emitting surface 48. In addition, the second upward/downward emission region 48b is disposed along an upper edge of the first upward/downward emission region 48a.

The first upward/downward emission region 48a is formed so as to make a point located at the vicinity of the first focal point $F1_{44}$ as the light emitting surface focal point (reference point) $F_{48}$. Accordingly, the lights of the plurality of optical paths internally reflected by the first reflecting surface 44 and concentrated to the first focal point $F1_{44}$ are emitted substantially parallel to each other in at least the vertical angle as the lights enter the first upward/downward emission region 48a.

In addition, in the embodiment, the first upward/downward emission region 48a has the optical axis L that coincides with the forward/rearward reference axis $AX_{40}$. Further, the optical axis L of the first upward/downward emission region 48a may not coincide with the forward/rearward reference axis $AX_{40}$ as long as the optical axis L is parallel to the forward/rearward reference axis $AX_{40}$. Accordingly, the light passing through the light emitting surface focal point $F_{48}$ and entering the first upward/downward emission region 48a is emitted in parallel to the forward/rearward reference axis $AX_{40}$ in at least the vertical angle. That is, the first upward/downward emission region 48a is configured to have a surface shape such that the light passing through the vicinity of the first focal point $F1_{44}$ is emitted in a direction substantially parallel to the forward/rearward reference axis $AX_{40}$ in at least the vertical angle. That is, the surface shape of first upward/downward emission region 48a is formed so that the elevation angle of the light emitted from the first upward/downward emission region 48a is substantially parallel with the elevation angle of the forward/rearward reference axis $AX_{40}$. In addition, the emission direction in the XZ plane of the light emitted from the first upward/downward emission region 48a may be different from the direction of the forward/rearward reference axis $AX_{40}$.

The second upward/downward emission region 48b is adjacent to the first upward/downward emission region 48a in the light emitting surface 48 in the upward/downward direction. The second upward/downward emission region 48b is disposed above the first upward/downward emission region 48a and standing up in the vertical direction with respect to a surface shape of the first upward/downward emission region 48a. Accordingly, the second upward/downward emission region 48b emits the entering light which has passed through the vicinity of the light emitting surface focal point $F_{48}$ in a direction inclined upward with respect to the forward/rearward reference axis $AX_{40}$. Further, as can be seen from the optical path shown in FIGS. 6 to 8, in the embodiment, the light entering a region above the forward/rearward reference axis $AX_{40}$ in the light emitting surface 48 is light emitted from the light source 26 from a point closer to the light source front end point 26b than to the light source central point 26a. Accordingly, in the embodiment, the light entering the second upward/downward emission region 48b is light emitted from the light source 26 from a point closer to the light source front end point 26b than to the light source central point 26a.

The light emitted from the second upward/downward emission region 48b can be used as light (hereinafter, referred to as overhead light) for radiating a traffic sign or the like because the light is emitted above the forward/rearward reference axis $AX_{40}$.

Figure 9:
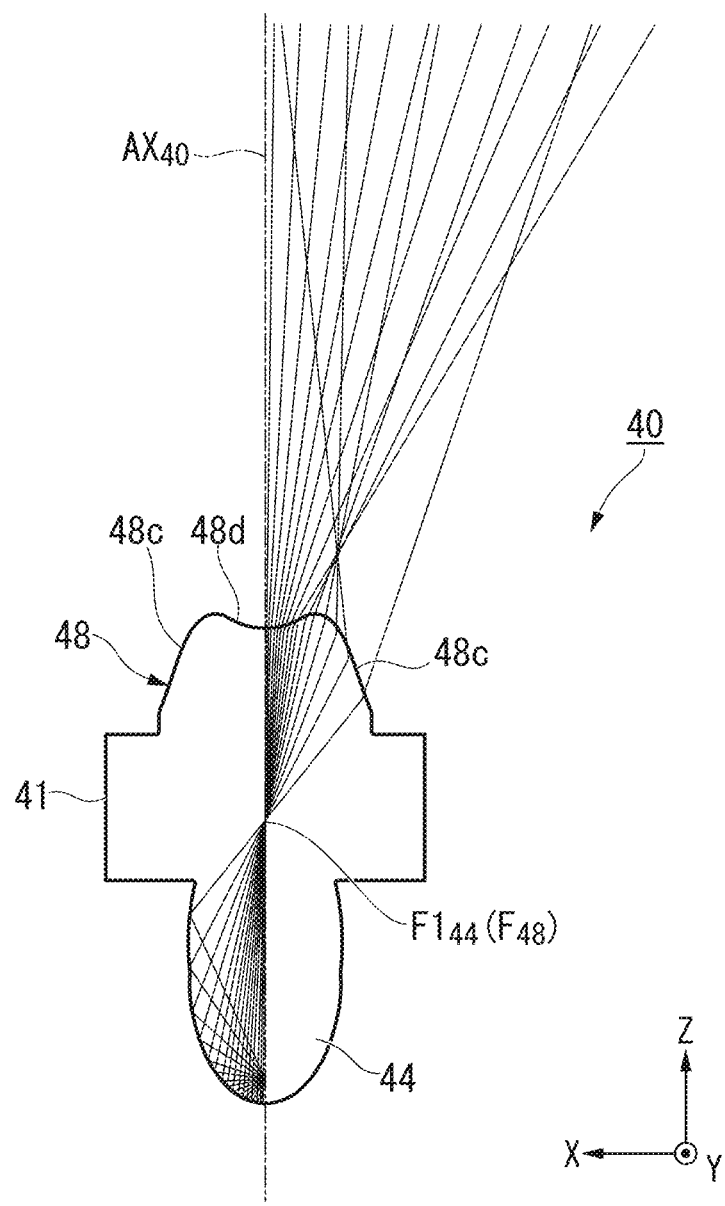
FIG. 9 is a cross-sectional view along an XZ plane of the lens body of the first embodiment.

FIG. 9 is a cross-sectional view along the XZ plane of the lens body 40, showing an optical path of light radiated from the light source central point 26a.

As shown in FIG. 9, in a cross section along a surface (the XZ plane) perpendicular to the upward/downward direction, the lens body 40 has two first leftward/rightward emission regions 48c and a second leftward/rightward emission region 48d. The first leftward/rightward emission regions 48c and the second leftward/rightward emission region 48d are adjacent to each other in the leftward/rightward direction. More specifically, the second leftward/rightward emission region 48d is disposed at a center of the light emitting surface 48 seen in the upward/downward direction, and the first leftward/rightward emission regions 48c are disposed at both sides in the leftward/rightward direction of the second leftward/rightward emission region 48d.

In addition, a cross section along a surface (the XZ plane) perpendicular to the upward/downward direction of the light emitting surface 48 constituted by the first leftward/rightward emission regions 48c and the second leftward/rightward emission region 48d has a shape bilaterally symmetrical with respect to the forward/rearward reference axis $AX_{40}$.

The first leftward/rightward emission regions 48c constitute a convex shape (a convex lens shape). The first leftward/rightward emission regions 48c refract the entered light which has passed through the first focal point $F1_{44}$ in a direction approaching the forward/rearward reference axis $AX_{40}$.

The second leftward/rightward emission region 48d constitutes a concave shape (a concave lens shape) recessed at a center portion thereof when seen in the upward/downward direction. More specifically, the second leftward/rightward emission region 48d constitutes a concave shape in which a position overlapping the forward/rearward reference axis $AX_{40}$ is recessed most deeply when seen in the upward/downward direction. The second leftward/rightward emission region 48d refracts the entered light which has passed through the first focal point $F1_{44}$ in a direction of separating away from the forward/rearward reference axis $AX_{40}$.

The light entering the light emitting surface 48 passes through the vicinity of the first focal point $F1_{44}$ because the light is internally reflected by the first reflecting surface 44 having an oval spherical shape. The first leftward/rightward emission regions 48c and the second leftward/rightward emission region 48d can be widely illuminated laterally to emit the entered light which has passed through the first focal point $F1_{44}$ in different left and right directions. In addition, in the light emitting surface 48 of the embodiment, the second leftward/rightward emission region 48d having a concave shape is disposed at a central side thereof with respect to the forward/rearward reference axis $AX_{40}$, and the first leftward/rightward emission regions 48c having convex shapes are disposed at the outer sides thereof. Accordingly, both of left and right sides with respect to the forward/rearward reference axis $AX_{40}$ can be widely radiated. Further, in the light emitting surface 48, as the first leftward/rightward emission regions 48c and the second leftward/rightward emission region 48d are bilaterally symmetrically disposed with respect to the forward/rearward reference axis, a light distribution pattern bilaterally symmetrical with respect to the forward/rearward reference axis $AX_{40}$ can be formed.

According to the embodiment, the light having a predetermined angular range with respect to the optical axis $AX_{26}$ of the light source 26, among the light from the light source 26 in the incident surface 42, is refracted in the concentration direction to enter the lens body. Accordingly, the incident angle of the light having the predetermined angular range with respect to the first reflecting surface 44 may be a critical angle or more. Further, as the optical axis $AX_{26}$ of the light source 26 is inclined with respect to the vertical axis V, the incident angle of the light from the light source 26 entering the lens body 40 with respect to the first reflecting surface 44 is a critical angle or more. That is, the light from the light source 26 can enter the first reflecting surface 44 at the incident angle of the critical angle or more. Accordingly, reduction in cost can be achieved without necessity of metal deposition on the first reflecting surface 44, and reflection loss occurring in the vapor deposition surface can be suppressed to increase utilization efficiency of light.

Hereinabove, while the embodiment of the present invention has been described, components of the embodiment, combinations thereof, and so on, are exemplarily provided, and additions, omissions, substitutions and other modifications of the components may be made without departing from the scope of the present invention. In addition, the present invention is not limited by the embodiment.

For example, in the above-mentioned embodiment, the example in which the present invention is applied to the lens body 40 configured to form the low beam light distribution pattern P (see FIG. 11) has been described. However, for example, the present invention may be applied to a lens body configured to form a light distribution pattern for a fog lamp, a lens body configured to form a light distribution pattern for a high beam, or another lens body.

In addition, in the above-mentioned embodiment, while the major axis $AX_{44}$ of the first reflecting surface 44 is inclined at the angle θ2 with respect to the forward/rearward reference axis $AX_{40}$, the embodiment is not limited thereto and the major axis $AX_{44}$ (a major axis) of the first reflecting surface 44 may not be inclined with respect to the major axis $AX_{44}$ (i.e., the angle θ2=0° is possible). Even in the above-mentioned case, as the size of the light emitting surface 48 is increased, the light from the light source 26 internally reflected by the first reflecting surface 44 can be efficiently introduced.

In addition, in the embodiment, while the case in which the second upward/downward emission region 48b is disposed along the upper edge of the first upward/downward emission region 48a has been exemplarily described, the present invention is not limited to the above-mentioned configuration. That is, the second upward/downward emission region 48b may be disposed under the first upward/downward emission region 48a in the light emitting surface 48, and further, the second upward/downward emission region 48b may be disposed to be sandwiched between two first upward/downward emission regions 48a from above and below.

Similarly, the disposition is not limited as long as the first leftward/rightward emission regions 48c and the second leftward/rightward emission region 48d are adjacent to each other in the leftward/rightward direction. For example, the first leftward/rightward emission regions 48c and the second leftward/rightward emission region 48d may have a positional relation in which the regions are reversed in comparison with the above-mentioned embodiment.

In addition, the upward/downward emission regions (the first upward/downward emission region 48a and the second upward/downward emission region 48b) and the leftward/rightward emission regions (the first leftward/rightward emission regions 48c and the second leftward/rightward emission region 48d) are independently defined. Accordingly, for example, the first leftward/rightward emission regions 48c may include the first upward/downward emission region 48a and the second upward/downward emission region 48b, respectively, or may include the first upward/downward emission region 48a only.

Second Embodiment

Next, a lens body 140 of the second embodiment will be described. In this embodiment, the components having same aspects with the above mentioned embodiment are assigned the same reference signs and a description thereof will be omitted.

Figure 12A:
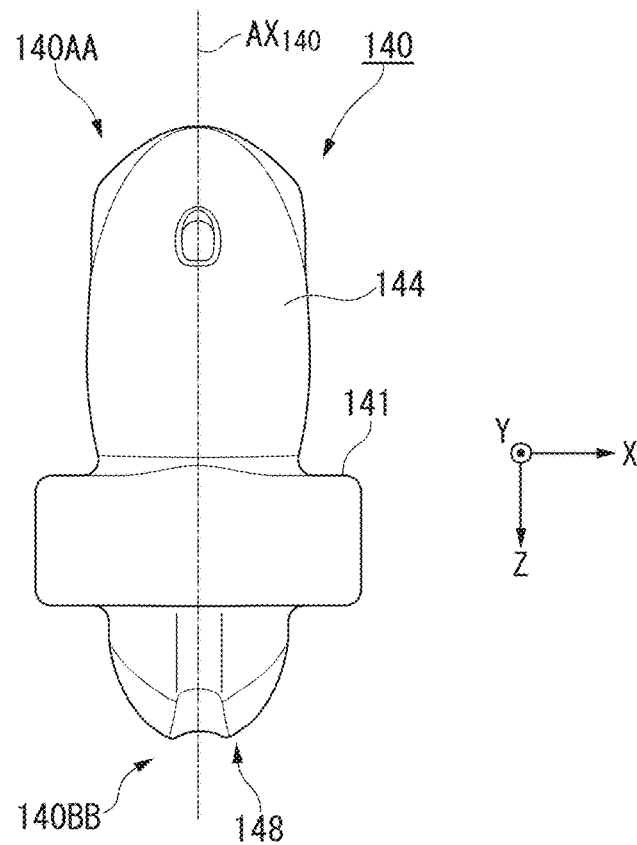
FIG. 12A is a plan view of a lens body of the second embodiment.
Figure 12B:
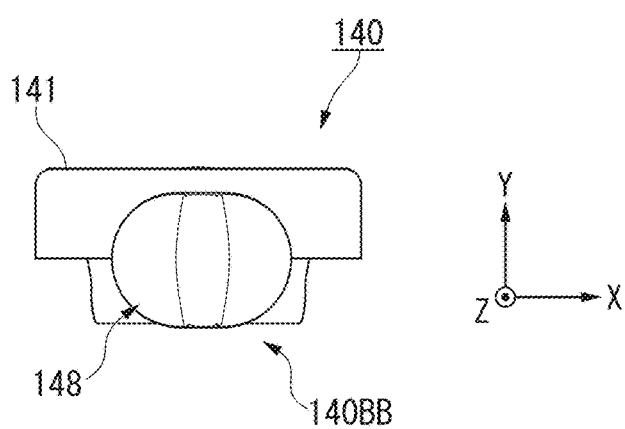
FIG. 12B is a front view of the lens body of the second embodiment.
Figure 12C:
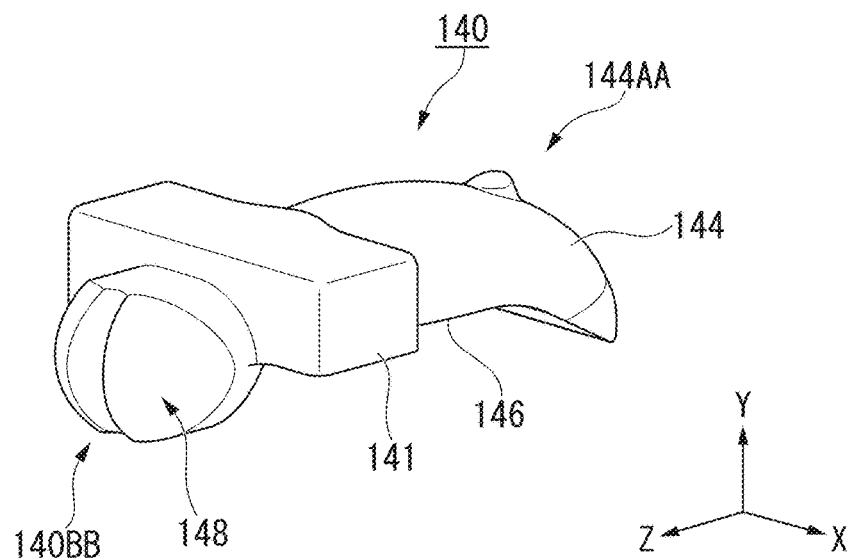
FIG. 12C is a perspective view of the lens body of the second embodiment.
Figure 12D:
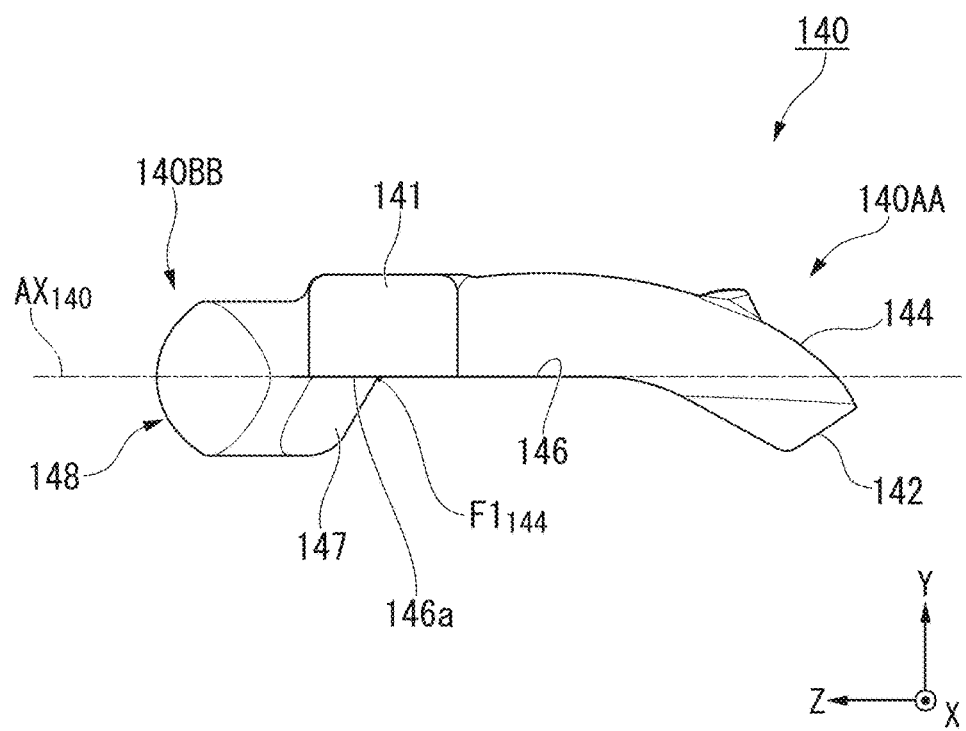
FIG. 12D is a side view of the lens body of the second embodiment.
Figure 12E:
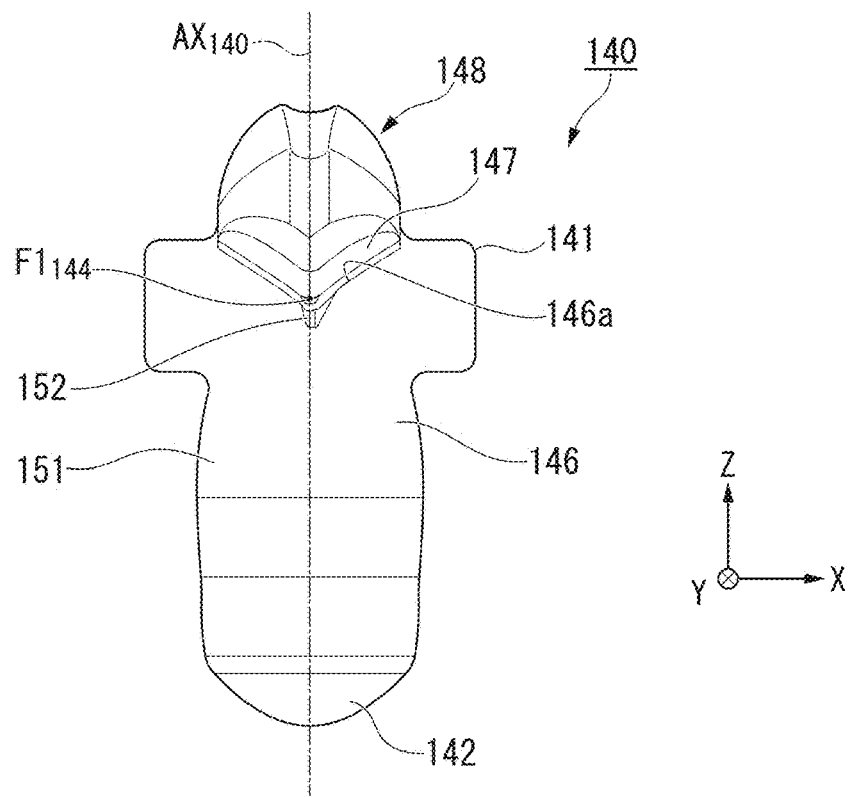
FIG. 12E is a bottom view of the lens body of the second embodiment.

FIG. 12A is a plan view of the lens body 140, FIG. 12B is a front view of the lens body 140, FIG. 12C is a perspective view of the lens body 140. FIG. 12D is a side view of the lens body 140 and FIG. 12E is a bottom view of the lens body 140.

The lens body 140 is a solid multi-face lens body having a shape extending along a forward/rearward reference axis $AX_{40}$. Further, in the embodiment, the forward/rearward reference axis $AX_{140}$ is an axis extending in a forward/rearward direction (an Z-axis direction) of a vehicle and serving as a reference line passing through a center of a light emitting surface 148 of the lens body 140, which will be described below. The lens body 140 is disposed in front of the light source (not shown). The lens body 140 includes a rear end portion 140AA directed rearward, and a front end portion 140BB directed forward. In addition, as shown in FIGS. 12A to 12D, the lens body 140 has a fixing section 141 extending in a leftward/rightward direction between the front end portion 140BB and the rear end portion 140AA. The lens body 140 is fixed to the lighting tool at the fixing section 141.

The lens body 140 has the incident surface (an incidence part) 142, the first reflecting surface 144, a second reflecting surface 146 and the light emitting surface 148. The incident surface 142 and the first reflecting surface 144 are disposed at the rear end portion 140AA of the lens body 140. In addition, the light emitting surface 148 is disposed at the front end portion 140BB of the lens body 140. The second reflecting surface 146 is disposed between the rear end portion 140AA and the front end portion 140BB.

The lens body 140 of the present embodiment is disposed in front of the light source (not shown) similar to the first embodiment. The incident surface 142 (see FIG. 12D) makes the light from the light source to enter inside the lens body. The first reflecting surface 144 internally reflects the light entered from the incident surface 142. Additionally, the first reflecting surface 144 includes an ellipsoidal sphere shape. The ellipsoidal sphere shaped first reflecting surface 144 includes a pair of focal point and the first focal point $F1_{144}$ arranged at front side locates at the front edge 146a of the second reflecting surface 146. The second reflecting surface 146 internally reflects a part of the light internally reflected at the first reflecting surface 144. The light emitting surface 148 reflects forward the light that has reached the light emitting surface 148 without being reflected at the second reflecting surface 146 and the light that has reached the light emitting surface 148 internally reflected at the second reflecting surface 146, among the light internally reflected at the first reflecting surface 144.

The second reflecting surface 146 is a surface configured to internally reflect (totally reflect) at least some of the light from the light source (not shown) internally reflected by the first reflecting surface 144. The second reflecting surface 146 is configured as a reflecting surface extending rearward form the vicinity of the first focal point $F1_{144}$. That is, the first focal point $F1_{144}$ is substantially disposed in an extension plane of the second reflecting surface 146. As shown in FIG. 12E, in the embodiment, the second reflecting surface 146 has a main surface section 151 and a sub-surface section 152. The main surface section 151 has a planar shape extending in parallel to the forward/rearward reference axis $AX_{140}$. The sub-surface section 152 locates at a center of the front edge of the main surface section 151. The sub-surface section 152 is formed so as to protrude upward with respect to the main surface section 151. That is, the lens body 140 recess at a portion corresponding to the sub-surface section 152.

The second reflecting surface 146 reflects light, among the light internally reflected by the first reflecting surface 144, passing below the first focal point $F1_{144}$ to the upward direction. When the light passing below the first focal point $F1_{144}$ enters the light emitting surface 148 without being reflected by the second reflecting surface 146, the light is emitted upward from the light emitting surface 148. As the second reflecting surface 146 is formed, the optical path of the light can be reversed and the light can enter the upper part of the light emitting surface 148 to be emitted downward. That is, since the second reflecting surface 146 is formed, the lens body 140 can reverse the optical path of the light, which is directing upward from the light emitting surface 148, and can form a light distribution pattern including the cutoff line CL at an upper edge of the lens body 140. A front edge 146a of the second reflecting surface 146 includes an edge shape configured to shield some of the light from the light source internally reflected by the first reflecting surface 144 and to form the cutoff line CL of the low beam light distribution pattern P. The front edge 146a of the second reflecting surface 146 is disposed in the vicinity of the first focal point $F1_{144}$.

As shown in FIGS. 12D and 12E, an inclined surface 147 inclined downward toward the front is arranged at the front of the front edge 146 of the second reflecting surface 146. A light is unlikely to enter the inclined surface 147 since it is facing backward. The front edge 146a is a boundary ridge line between the second reflecting surface 146 and the inclined surface 147.

Figure 13:
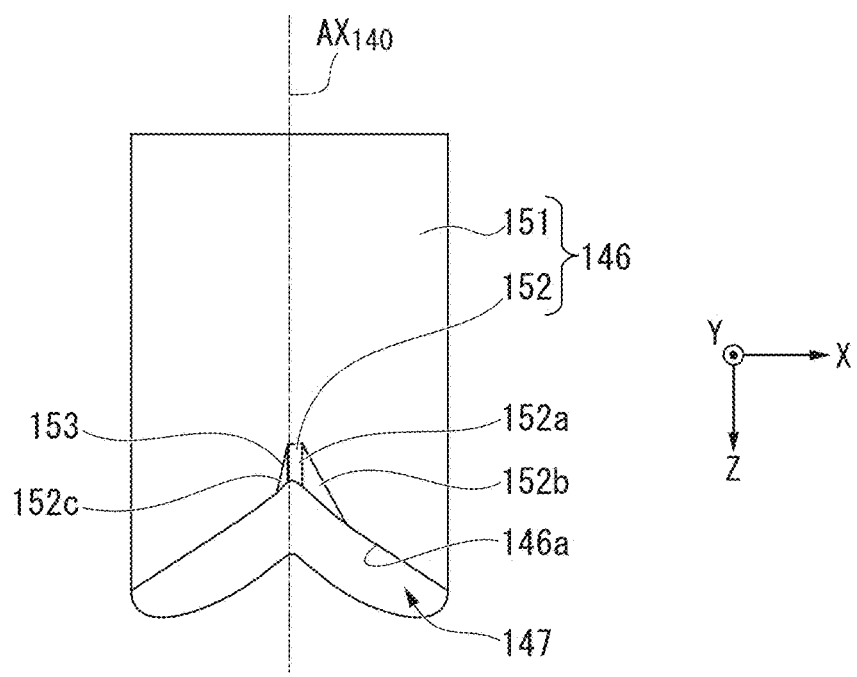
FIG. 13 is a plan view of the second reflecting surface and the inclined surface of the lens body of the second embodiment.
Figure 14:
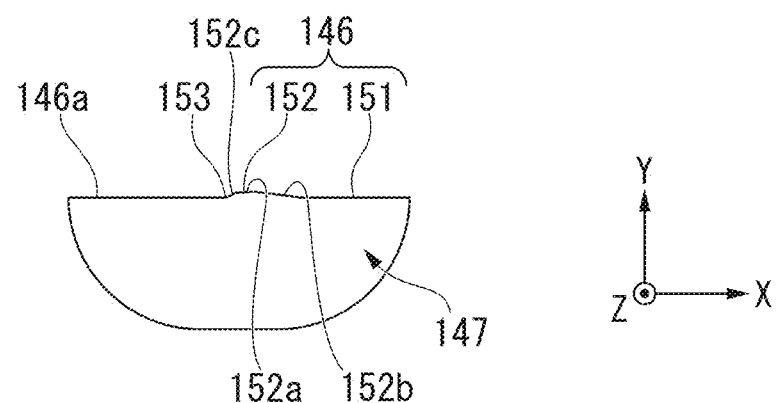
FIG. 14 is a front view of the inclined surface of the lens body of the second embodiment.
Figure 15:
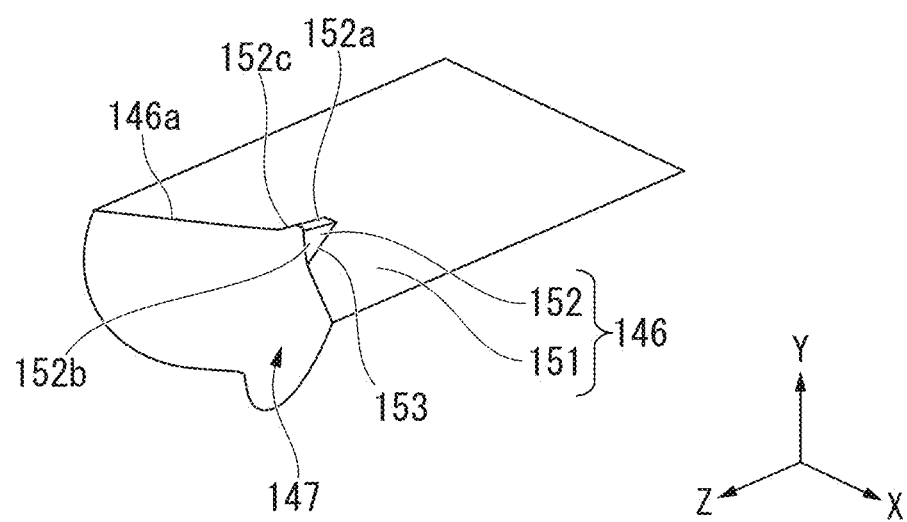
FIG. 15 is a perspective view of the second reflecting surface and the inclined surface of the lens body of the second embodiment.

FIG. 13 is a plan view of the second reflecting surface 146 and the inclined surface 147. FIG. 14 is a front view of the inclined surface 147. FIG. 15 is a perspective view of the second reflecting surface 146 and the inclined surface 147. In FIGS. 13 to 15, in order to emphasis the second reflecting surface 146 and the inclined surface 147, the drawing of other surfaces consisting the lens body 140 are omitted.

The front edge 146a of the second reflecting surface 146 of the present embodiment is formed so as to extend more forward as separated from a center part thereof in the leftward/rightward direction. The front edge 146a of the second reflecting surface 146 is extended forward so that portions separated farther from a center part thereof in the leftward/rightward direction are located at more forward positions. Therefore, the front edge 146a has a V-shape when viewed from the upper/lower side in the vertical direction. As described above, the front edge 146a includes an edge shape that forms the cutoff line CL. Since the front edge 146a is formed so as to extend more forward as separated from a center part thereof in the leftward/rightward direction, it is possible to match the boundaries of the pattern of the emitted light from the light emitting surface 148 in which some of the light being shield by the front edge 146a of the second reflecting surface 146 and the pattern of the emitted light from the light emitting surface 148 which is reflected by the second reflecting surface 146. Accordingly, it is possible to form more clear cutoff line CL.

The second reflecting surface 146 of the present embodiment includes a main surface section 151 and a sub-surface section 152 deviated upward with respect to the main surface section 151. The main surface section 151 has a flat surface. The sub-surface section 152 protrudes upward with respect to the main surface section 151. The sub-surface section 152 extends backward from the substantially center part of the front edge 146a of the second reflecting surface 146. At least a part of the a boundary part 153 between the main surface section 151 and the sub-surface section 152 extends backward from the front edge 146a of the second reflecting surface 146. Therefore, the front edge 146a forms a step at the boundary part 153 in the vertical direction. Accordingly, a step in the vertical direction is formed at the cutoff line CL.

The sub-surface section 152 of the present embodiment includes a sub-surface center part 152a and a sub-surface left part 152b and a sub-surface right part 152c respectively located at both sides of the sub-surface center part 152a. The main surface section 151 is arranged at the back of the sub-surface center part 152a, the sub-surface left part 152b and the sub-surface right part 152c via the boundary part 153. In addition, the inclined surface 147 is arranged at front of the sub-surface center part 152a, the sub-surface left part 152b and the sub-surface right part 152c via the front edge 146a. The boundary of the sub-surface center part 152a and the sub-surface right part 152c locates at the substantially center part in the leftward/rightward direction.

In the present embodiment, the sub-surface section 152 is defined as a part deviated upward with respect to the main surface section 151. However, either one of the main surface section 151 and the sub-surface section 152 can be arranged upward as long as they are deviated with each other in the vertical direction.

In addition, in the present embodiment, it is explained that the second reflecting surface 146 includes one sub-surface section 152. However, the second reflecting surface 146 may include two or more sub-surface sections 152.

Example

Hereinafter, effects of the present invention will be more clearly described by the following examples. Further, the present invention is not limited to the following examples and may be appropriately varied and performed without departing from the scope of the present invention.

<Light Distribution Pattern Corresponding to the First Embodiment>

With respect to the lighting tool 10 for a vehicle of the above-mentioned embodiment, simulation of a light distribution pattern with respect to an imaginary vertical screen facing the lens body 40 in front of the lens body 40 was performed. FIGS. 10(a) to 10(d) show light distribution patterns of light radiated from different regions of the light emitting surface 48.

Figure 10:
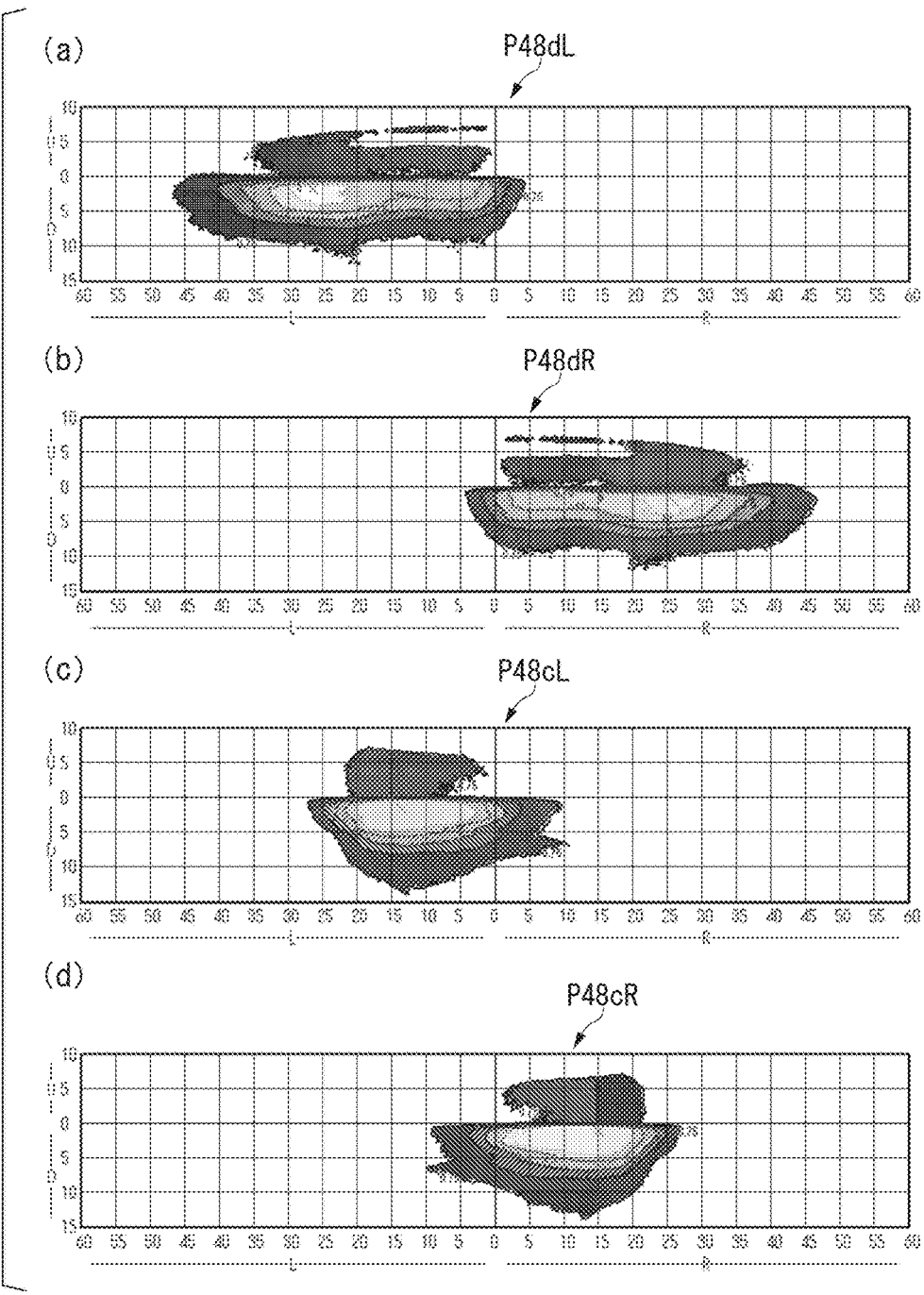
FIG. 10 is a light distribution pattern of light radiated from different regions of a light emitting surface of the lens body of the first embodiment.

FIG. 10(a) shows a light distribution pattern P48dL of light radiated from the second leftward/rightward emission region 48d disposed at a left side of the forward/rearward reference axis $AX_{40}$ when seen from above.

FIG. 10(b) shows a light distribution pattern P48dR of light radiated from the second leftward/rightward emission region 48d disposed at a right side of the forward/rearward reference axis $AX_{40}$ when seen from above.

FIG. 10(c) shows a light distribution pattern P48cL of light radiated from the first leftward/rightward emission regions 48c disposed at a left side of the forward/rearward reference axis $AX_{40}$ when seen from above.

FIG. 10(d) shows a light distribution pattern P48cR of light radiated from the first leftward/rightward emission regions 48c disposed at a right side of the forward/rearward reference axis $AX_{40}$ when seen from above.

As shown in FIGS. 10(a) to 10(d), it will be appreciated that the lights radiated from the regions have distributions in different directions.

Figure 11:
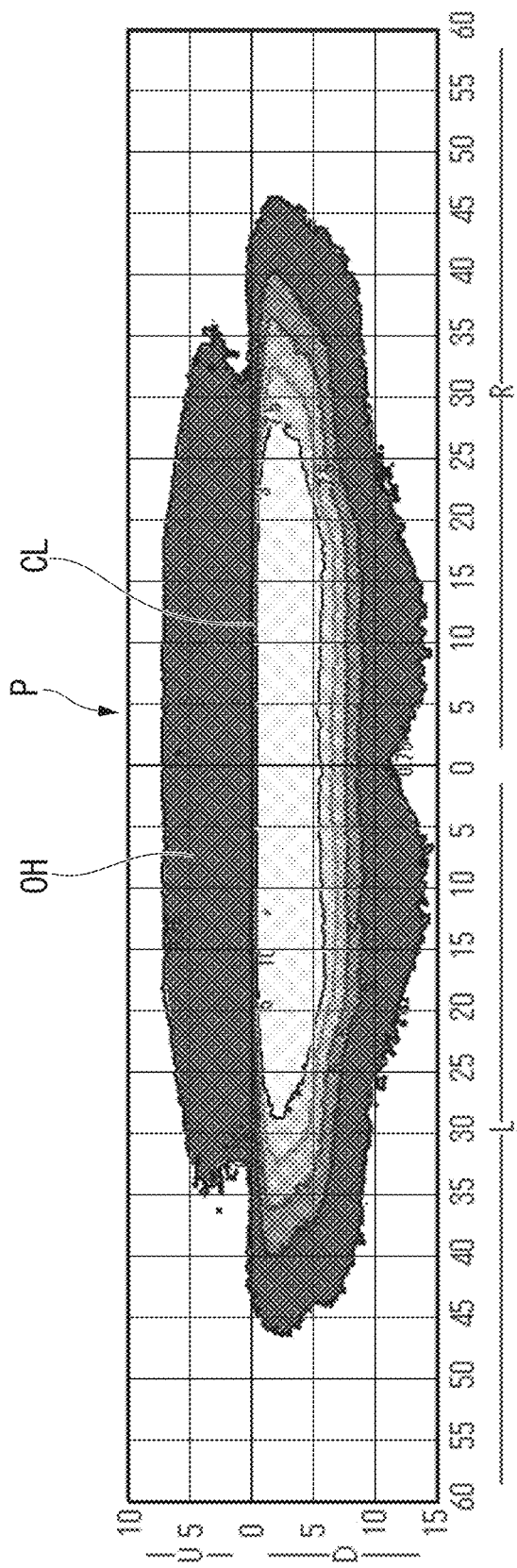
FIG. 11 is a light distribution pattern of a light emitting surface of the lens body of the first embodiment.

FIG. 11 shows a simulation result of a light distribution pattern P radiated to an imaginary vertical screen facing the lens body 40 in front of the lens body 40. The light distribution pattern P is a light distribution pattern in which the light distribution patterns P48dL, P48dR, P48cL and P48cR of FIGS. 10(a) to 10(d) overlap each other.

As shown in FIG. 11, it will be appreciated that the light distribution pattern P is radiated forward widely with good balance. In addition, it was confirmed that the light distribution pattern P can form the cutoff line CL at the upper edge thereof. In addition, it was confirmed that an overhead light OH is radiated above the cutoff line CL.

<Light Distribution Pattern Corresponding to the Second Embodiment>

Figure 16:
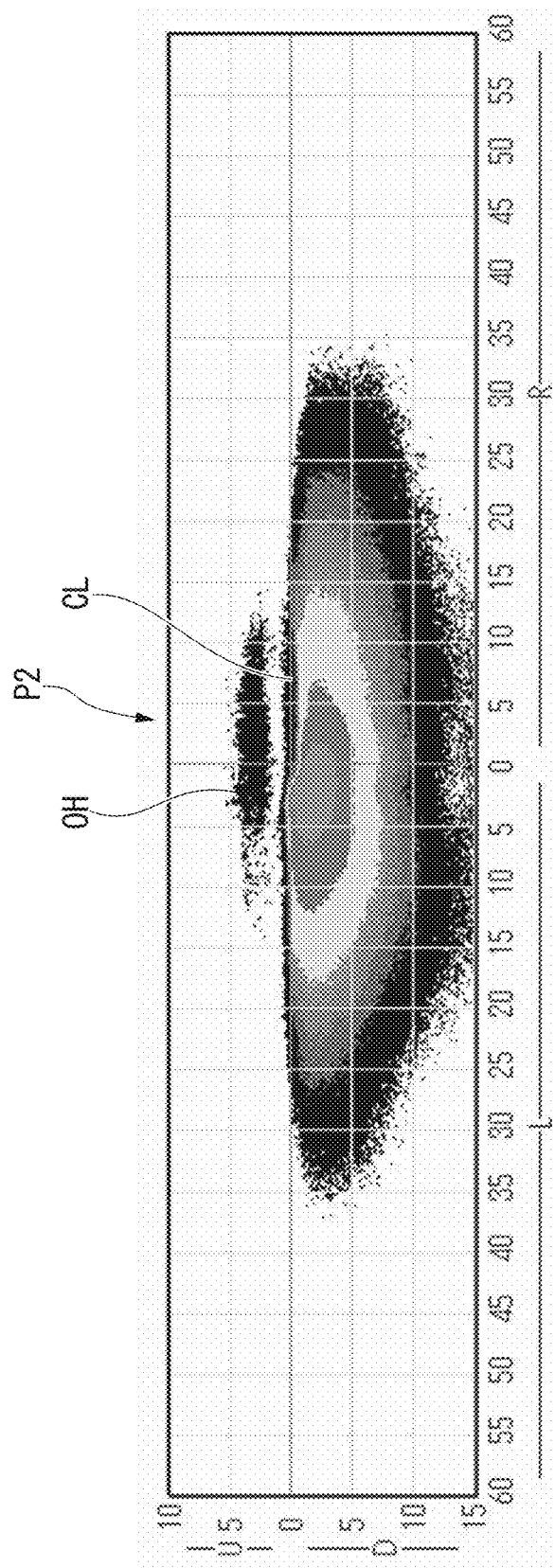
FIG. 16 is a light distribution pattern of the lens body of the second embodiment.

FIG. 16 shows a simulation result of a light distribution pattern P2 of the lens body 140 of the above described second embodiment. As shown in FIG. 16, it was confirmed that the light distribution pattern P2 can form the cutoff line CL having a step at a vicinity of the center part.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lens body that is disposed in front of a light source and that includes a rear end portion and a front end portion, and that is configured to emit light from the light source, which has entered an inside of the lens body, forward from the front end portion along a forward/rearward reference axis extending in a forward/rearward direction of a vehicle, the lens body comprising:

an incidence part configured to cause light having a predetermined angular range with respect to an optical axis of the light source, among the lights from the light source, to be refracted in a concentration direction and to be entered inside the lens body;

a first reflecting surface configured to internally reflect the light from the light source which has entered from the incidence part;

a second reflecting surface configured to internally reflect at least some of the light internally reflected by the first reflecting surface; and a light emitting surface disposed at the front end portion and configured to emit the light internally reflected by the first reflecting surface and the light internally reflected by the second reflecting surface forward, wherein the optical axis of the light source is inclined with respect to a vertical direction such that an incident angle of the light from the light source, which has entered from the incidence part, with respect to the first reflecting surface is a critical angle or more, the first reflecting surface includes an elliptic spherical shape rotatable symmetrical with respect to a major axis and has, on the major axis, a first focal point in the front side and a second focal point in the rear side, serving as focal points of the elliptic spherical shape, the second focal point is disposed at a vicinity of an imaginary light source position which is an intersection when it is assumed that refracted lights which are lights from the light source that have entered from the incidence part are extending in an opposite direction, the second reflecting surface has a planar shape extending rearward and in parallel to the forward/rearward reference axis, the second reflecting surface has, at the front thereof, a front edge, the first focal point is disposed in the vicinity of the front edge of the second reflecting surface, the light emitting surface has a convex shape at a cross section along a surface perpendicular to a leftward/rightward direction of the vehicle, the convex shape having an optical axis parallel to the forward/rearward reference axis and having a reference point formed at a point located at the vicinity of the first focal point, the light emitting surface has a first leftward/rightward emission region and a second leftward/rightward emission region at a cross section along a surface perpendicular to an upward/downward direction of the vehicle, the first leftward/rightward emission region and the second leftward/rightward emission region being adjacent to each other in the leftward/rightward direction, the light emitting surface has a first upward/downward emission region and a second upward/downward emission region in a cross section along a surface perpendicular to the leftward/rightward direction of the vehicle, the first upward/downward emission region and the second upward/downward emission region being adjacent to each other in the upward/downward direction, the second upward/downward emission region is disposed above the first upward/downward emission region, the first leftward/rightward emission region refracts an entered light, which has passed through the first focal point, in a direction approaching the forward/rearward reference axis, the second leftward/rightward emission region refracts an entered light, which has passed through the first focal point, in a direction separating away from the forward/rearward reference axis, the light source has a light emitting surface with a predetermined area, the light emitting surface facing the incidence part, the light emitting surface has a light source central point that is a center of the light emitting surface, a light source front end point that is an end point of a forward side of the light emitting surface, and a light source rear end point that is an end point of a rearward side of the light emitting surface, the light radiated from the light source central point is concentrated to the first focal point without being internally reflected by the second reflecting surface, reaches the first upward/downward emission region of the light emitting surface to be emitted forward, the light radiated from the light source rear end point passes above the first focal point without being internally reflected by the second reflecting surface, and reaches the first upward/downward emission region of the light emitting surface to be emitted forward and downward, and the light radiated from the light source front end point is internally reflected by the second reflecting surface, passes above the first focal point, and reaches the second upward/downward emission region of the light emitting surface to be emitted forward and downward, whereby a light distribution pattern including a cutoff line defined by the front edge of the second reflecting surface is formed at an upper edge of the lens body.

2. The lens body according to claim 1,
wherein the light emitting surface has a surface shape configured such that the light passing through the vicinity of the first focal point is emitted in a direction substantially parallel to the forward/rearward reference axis when viewed from the side in a horizontal direction.

3. The lens body according to claim 1,
wherein
the second upward/downward emission region has a shape standing up in the vertical direction with respect to a surface shape of the first upward/downward emission region, and emits the entered light in a direction inclined upward with respect to the forward/rearward reference axis.

4. The lens body according to claim 1,
wherein the second leftward/rightward emission region has a concave shape recessed at a central portion of the second leftward/rightward emission region when seen in the upward/downward direction, and
the first leftward/rightward emission region has convex shapes arranged at both sides in the leftward/rightward direction of the second leftward/rightward emission region.

5. The lens body according to claim 1,
wherein a distance and eccentricity between the first focal point and the second focal point of the first reflecting surface are set such that the light from the light source internally reflected by the first reflecting surface and concentrated to the vicinity of the focal point of the light emitting surface is captured by the light emitting surface.

6. The lens body according to claim 1,
wherein the major axis is inclined with respect to the forward/rearward reference axis and the second focal point is disposed below the first focal point.

7. The lens body according to claim 1,
wherein the second reflecting surface is set to an angle with respect to the forward/rearward reference axis such that the light internally reflected by the second reflecting surface, among the light internally reflected by the first reflecting surface, is captured by the light emitting surface.

8. The lens body according to claim 7,
wherein the second reflecting surface is set to an angle with respect to the forward/rearward reference axis such that the light reaching the light emitting surface being internally reflected by the first reflecting surface and not being internally reflected by the second reflecting surface is not shielded.

9. The lens body according to claim 1,
wherein the front edge of the second reflecting surface is formed so as to extend more forward as separated from a center part thereof in the leftward/rightward direction.

10. The lens body according to claim 9,
wherein the second reflecting surface comprises a main surface section and a sub-surface section deviated with respect to the main surface in the vertical direction, and
at least a part of a boundary of the main surface section and the sub-surface section is extended backward from the front edge.

11. A lighting tool for a vehicle comprising:
the lens body and the light source according to claim 1.

* * * * *